(12) United States Patent
Dean

(10) Patent No.: US 10,344,657 B2
(45) Date of Patent: Jul. 9, 2019

(54) SYSTEM AND METHOD FOR PARTICULATE FILTER REGENERATION

(71) Applicant: GM GLOBAL TECHNOLOGY OPERATIONS LLC, Detroit, MI (US)

(72) Inventor: Charles E. Dean, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 421 days.

(21) Appl. No.: 15/042,663

(22) Filed: Feb. 12, 2016

(65) Prior Publication Data
US 2017/0234198 A1    Aug. 17, 2017

(51) Int. Cl.
| F01N 3/00 | (2006.01) |
| F01N 9/00 | (2006.01) |
| B60W 10/06 | (2006.01) |
| B60W 10/11 | (2012.01) |
| B60W 30/18 | (2012.01) |
| F01N 3/023 | (2006.01) |
| F01N 3/025 | (2006.01) |

(52) U.S. Cl.
CPC ............ *F01N 9/002* (2013.01); *B60W 10/06* (2013.01); *B60W 10/11* (2013.01); *B60W 30/18* (2013.01); *F01N 3/023* (2013.01); *F01N 3/0253* (2013.01); *B60W 2510/1005* (2013.01); *B60W 2520/10* (2013.01); *B60W 2530/12* (2013.01); *B60W 2560/00* (2013.01); *B60W 2710/0644* (2013.01); *B60W 2710/1005* (2013.01); *B60W 2900/00* (2013.01); *F01N 2260/04* (2013.01); *F01N 2550/04* (2013.01); *F01N 2560/08* (2013.01); *F01N 2900/10* (2013.01); *F01N 2900/1606* (2013.01); *Y02T 10/47* (2013.01)

(58) Field of Classification Search
CPC ...... B60W 10/06; F01N 9/002; F01N 3/0253; F01N 3/023
USPC ......................................................... 60/274
See application file for complete search history.

(56) References Cited

U.S. PATENT DOCUMENTS

| 7,685,815 B2 * | 3/2010 | Gudorf ................. | B60W 10/06 180/309 |
| 2008/0163610 A1 * | 7/2008 | Baird .................... | F01N 3/0842 60/295 |

(Continued)

FOREIGN PATENT DOCUMENTS

| CN | 1517520 A | 8/2004 |
| FR | 2820462 A1 | 8/2002 |

*Primary Examiner* — Jason D Shanske
(74) *Attorney, Agent, or Firm* — Quinn IP Law

(57) ABSTRACT

A system and method of reducing particulate matter accumulation in a diesel particulate filter of an exhaust system of a vehicle comprises operating the vehicle including an engine connected to the exhaust system in a drive mode. At least one parameter indicative of particulate matter accumulation in the diesel particulate filter is monitored and evaluated against a predetermined particulate matter accumulation limit. Control logic determines at least one operating parameter of the vehicle and adjusts the transmission assembly from a first transmission position to at least one second transmission position to increase engine speed and generate higher exhaust gas flow when the particulate matter accumulation is greater than the predetermined particulate matter accumulation to regenerate the diesel particulate filter.

22 Claims, 3 Drawing Sheets

(56) References Cited

U.S. PATENT DOCUMENTS

| | | | | |
|---|---|---|---|---|
| 2012/0227379 A1* | 9/2012 | Koestler | ............... | F01N 3/023 |
| | | | | 60/274 |
| 2015/0135680 A1* | 5/2015 | Ancimer | ............... | F02D 41/027 |
| | | | | 60/274 |
| 2015/0275800 A1* | 10/2015 | Stenlaas | ............... | B60W 10/00 |
| | | | | 123/676 |
| 2016/0131011 A1* | 5/2016 | Hamsten | ............... | F02D 41/26 |
| | | | | 701/34.4 |
| 2016/0160723 A1* | 6/2016 | Thomas | ............... | F01N 3/101 |
| | | | | 60/274 |
| 2017/0044948 A1* | 2/2017 | Caine | ............... | F02D 41/0255 |
| 2017/0122178 A1* | 5/2017 | Hatta | ............... | F01N 3/023 |

* cited by examiner

SYSTEM AND METHOD FOR PARTICULATE FILTER REGENERATION

TECHNICAL FIELD

The present disclosure pertains to a system and method for diesel particulate filter regeneration utilizing a custom transmission shift schedule.

BACKGROUND

Various exhaust gas treatment devices, such as particulate filters and other devices, may be used to limit exhaust emissions of internal combustion engines. A treatment system for an exhaust gas of a diesel engine may include a diesel particulate filter (DPF) to reduce emissions of particulate matter (soot) generated during combustion.

A DPF acts as a trap of particulate filter for removing the particulate matter from the exhaust stream. The DPF may include noble metals such as platinum and/or palladium, which serve as catalysts, to further oxidize black carbon and hydrocarbons that are present in the exhaust stream.

In many cases, the DPF can be regenerated or cleaned using superheated exhaust gas to burn off the accumulated particulate matter. The DPF may be regenerated, or cleaned, after a predetermined soot level is reached. The DPF may be regenerated by modifying the combustion process of the diesel engine or injecting fuel into the exhaust stream in order to increase the temperature of the exhaust gas.

SUMMARY

A system and method of reducing particulate matter accumulation in a diesel particulate filter of an exhaust system of a vehicle is disclosed. The vehicle including an engine connected to the exhaust system is operated in a drive mode. At least one parameter indicative of particulate matter accumulation in the diesel particulate filter is monitored and evaluated against a predetermined particulate matter accumulation limit.

A transmission assembly is operatively connected to the engine. A controller in communication with the transmission assembly determines the condition of the transmission and increases engine speed through the transmission assembly to increase exhaust gas flow when the particulate matter accumulation is greater than the predetermined particulate matter accumulation limit.

The controller includes control logic to determine at least one operating parameter of the vehicle and adjusts the transmission assembly from a first transmission position to at least one second transmission position in response to the at least one operating parameter of the vehicle to increase the exhaust temperature of the engine relative to a normal drive mode. A regeneration process is applied to the diesel particulate filter by burning off the particulate matter accumulation using the increased oxygen gas flow in the exhaust gas flow from the engine during the drive mode. In one embodiment of the disclosure, the controller communicates with a diesel particulate filter evaluation module to monitor the diesel particulate filter and evaluate the at least one parameter indicative of particulate matter accumulation in the diesel particulate filter against a predetermined particulate matter accumulation. The diesel particulate filter evaluation module may monitor a pressure differential across the diesel particulate filter.

In another embodiment of the disclosure, the controller communicates with a transmission control module in communication with the transmission assembly and configured to adjust the transmission assembly between the first transmission position and at the least one second transmission position. The transmission control module may adjust the transmission assembly from the first transmission position to at least one second transmission position lower than the first transmission position. The controller may detect the speed of the vehicle as at least one operating parameter of the vehicle such that the transmission assembly is adjusted from a first transmission position to at least a second lower transmission position in response to the detection of a vehicle speed of at least about 25 miles per hour.

In another embodiment of the disclosure, a method of reducing particulate matter in a diesel particulate filter of an exhaust system of a vehicle comprises operating the vehicle in a drive mode and monitoring at least one parameter indicative of particulate matter accumulation in the diesel particulate filter. A diesel particulate filter evaluation module evaluates the at least one parameter indicative of particulate matter accumulation against a predetermined particulate matter accumulation with a diesel particulate filter evaluation module.

Control logic of the controller determines a condition of a transmission assembly operatively connected to the engine with a transmission control module in communication with the transmission assembly and increases engine speed with the transmission assembly to increase exhaust gas flow when the determined particulate matter accumulation is greater than the predetermined particulate matter accumulation limit.

The control logic may determine the speed of the vehicle and adjust the transmission assembly from a first transmission position to at least one second transmission position in response to the speed of the vehicle to adjust the engine speed and increase the exhaust gas flow of the engine relative to a normal drive mode. The diesel particulate filter is regenerated by burning off the particulate matter accumulation using the increased oxygen gas flow in the exhaust gas flow from the engine during the drive mode.

In one embodiment of the disclosure, the method further comprises the step of monitoring a pressure differential across the diesel particulate filter with the diesel particulate filter evaluation module. The transmission control module may adjust the transmission assembly from the first transmission position to at least one second transmission position lower than the first transmission position. The transmission assembly may be adjusted from the first transmission position to the at least second lower transmission position in response to the detection of a vehicle speed of at least about 25 miles per hour.

In another embodiment of the disclosure, a vehicle comprising an engine assembly, a transmission assembly operatively connected to the engine assembly and an exhaust system connected to the engine assembly including a diesel particulate filter are provided. The vehicle includes a controller in communication with the engine assembly, transmission assembly and exhaust system having control logic configured to monitor at least one parameter indicative of particulate matter accumulation in the diesel particulate filter.

The control logic evaluates the at least one parameter indicative of particulate matter accumulation against a predetermined particulate matter accumulation limit with a diesel particulate filter evaluation module and determines the operating mode of the transmission assembly with a transmission control module in communication with the transmission assembly. The control logic next determines the speed of the vehicle and adjusts the transmission assembly from a first transmission position to at least one second transmission position in response to the speed the vehicle to increase engine speed.

The control logic applies a load to the engine through the transmission assembly to increase exhaust gas flow from the engine when the determined particulate matter accumulation is greater than the predetermined particulate matter accumulation limit. The diesel particulate filter is regenerated by burning off the particulate matter accumulation using the increased oxygen gas flow from the exhaust gas flow from the engine.

In one embodiment of the disclosure, the vehicle further comprises a diesel particulate filter evaluation module in communication with the controller configured to monitor the diesel particulate filter and evaluate the at least one parameter indicative of particulate matter accumulation in the diesel particulate filter against a predetermined particulate matter accumulation limit. A transmission control module in communication with the transmission assembly and the controller is configured to adjust the transmission assembly between the first transmission position and at least one second transmission position. The transmission assembly is adjusted from a first transmission position to at least a second lower transmission position in response to the detection of a vehicle speed of at least about 25 miles per hour.

The above noted and other features and advantages of the present disclosure are readily apparent from the following detailed description when taken in connection with the accompanying drawings.

DETAILED DESCRIPTION

Figure 1:
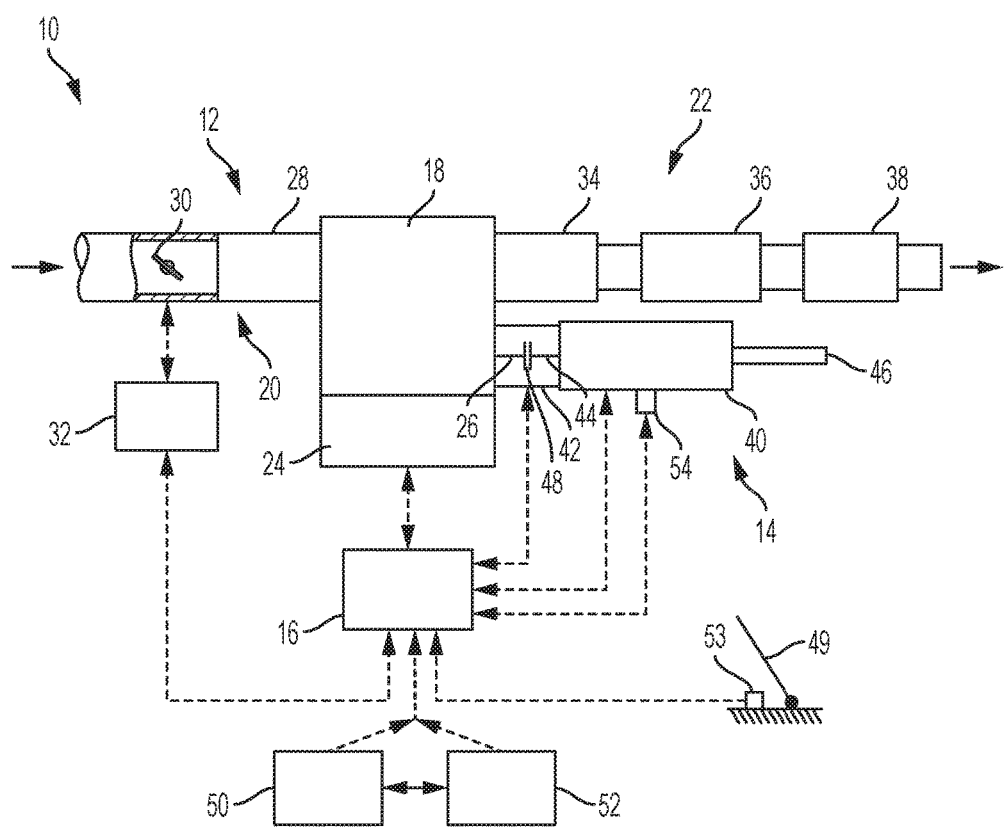
FIG. 1 is a schematic illustration of an engine assembly of a vehicle according to the present disclosure.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Referring now to the drawings, wherein like reference numbers correspond to like or similar components throughout the several figures, FIG. 1 a vehicle 10 may include an engine assembly 12, a transmission assembly 14, and a controller 16. The vehicle 10 may include a motorized vehicle, such as, but not limited to, standard passenger cars, sport utility vehicles, light trucks, heavy duty vehicles, minivans, buses, transit vehicles, bicycles, robots, farm implements, sports-related equipment or any other transportation device. Engine assembly 12 may include a diesel engine 18, an intake system 20, an exhaust system 22, and a fuel system 24.

Diesel engine 18 may include a crankshaft 26 providing an output torque therefrom. The diesel engine 18 may be any suitable internal combustion engine capable of transforming hydrocarbon fuel to mechanical power to generate torque in response to commands originating from the controller 16. Intake system 20 may be in communication with diesel engine 18 and may include an intake manifold 28, a throttle 30, and an electronic throttle control (ETC) 32.

ETC 32 may actuate throttle 30 to control an air flow into diesel engine 18. Exhaust system 22 may be in communication with diesel engine 18 and may include an exhaust manifold 34, a catalyst 36, and a diesel particulate filter (DPF) 38. In one embodiment of the disclosure, the vehicle exhaust system may have multiple exhaust combustion modes, including, but not limited to, a normal operating mode, an exhaust warm-up operating mode and a DPF regeneration mode. Fuel system 24 may provide fuel to diesel engine 18. An exhaust gas flow created by combustion of the air/fuel mixture may exit diesel engine 18 through exhaust system 22. The flow of exhaust gasses through the exhaust system 22 in a normal combustion mode when the vehicle is in a drive mode is the same as a conventional engine under normal operating conditions.

Transmission assembly 14 may include a transmission 40 and a coupling device 42. Transmission 40 may be an automatic transmission or a manual transmission and may include input and output shafts 44, 46. Coupling device 42 may generally be in the form of a torque converter including a torque converter clutch (TCC) 48. TCC 48 may be actuated to provide engagement between crankshaft 26 and input shaft 44. Transmission 40 may drive output shaft 46 to allow rotation thereof, thereby allowing transmission of drive torque to wheels (not shown) of vehicle 10. A gear shifter (not shown) may be connected by a mechanical linkage (not shown) to the transmission 40 to allow the operator of the vehicle 10 to select one of a plurality of gears.

Controller 16 may be in communication with engine assembly 12, transmission assembly 14, and an accelerator pedal 49. Controller 16 may include a variety of vehicle monitoring systems or modules, including, but not limited to, an engine load control module 50, and a DPF evaluation module 52. Engine load control module 50 and DPF evaluation module 52 may be in communication with each other in addition to the controller 16.

In one embodiment of the disclosure, controller 16 may be in communication with fuel system 24 and ETC 32 to control air flow and fuel flow into diesel engine 18. Controller 16 may additionally be in communication with an accelerator pedal sensor 53 of accelerator pedal 49 and may receive a signal indicative of accelerator pedal position therefrom. Controller 16 may generally determine an operating speed of diesel engine 18 and may control operation of diesel engine 18 at an idle condition.

Engine load control module 50 may be in communication with transmission 40, a transmission fluid temperature sensor 54, and coupling device 42. Engine load control module 50 may cooperate with a transmission control module (TCM) described in greater detail below to determine an operating condition of the gears of transmission 40. Engine load control module 50 may selectively engage output shaft 46 of transmission 40 and may selectively actuate TCC 48 to provide a load to diesel engine 18. Engine load control module 50 may additionally monitor the temperature of transmission fluid provided by transmission fluid temperature sensor 54.

The DPF evaluation module 52 may be in communication with the engine load control module 50. DPF evaluation module 52 may determine a soot or particulate matter accumulation level in DPF 38. DPF evaluation module 52 may be employed to monitor various real-time operating parameters of the exhaust flow and estimate the amount of particulate matter contained within the DPF 38 relative to a predetermined particulate matter accumulation limit. If the estimate exceeds the predetermined particulate matter accumulation limit or threshold, the DPF evaluation module 52 may request a regeneration process for the DPF 38 from the engine (or an associated engine control module) to burn off the collected particulate matter within the DPF 38 as will be described in greater detail below.

The DPF 38 may be configured to filter particulate matter, i.e., soot, from the exhaust gas from the diesel engine 18 delivered through the exhaust system 22. The DPF 38 may include one or more substrates (not shown) that define a plurality of apertures through which the exhaust gas must flow. As the exhaust gas passes through the exhaust system 22 to DPF 38, suspended airborne particulate matter may collect on the substrate, where it may be separated from the flow. Over the life of the vehicle 10, the DPF 38 may occasionally need to be regenerated to remove any collected particulate matter.

In one configuration, the DPF 38 may be regenerated by heating the exhaust gases delivered through the exhaust system 22 to the DPF 38 to a temperature sufficient to burn the particulate matter off of the substrate. In general, the process of "burning off" the particulate matter may involve converting the sooty trapped particulate matter into carbon dioxide, which may be more permissibly dissipated into the atmosphere.

In one embodiment of the disclosure, the controller 16 may receive an indication of a current engine load parameter from the engine load control module 50 in combination with information about particulate matter accumulation from the DPF evaluation module 52. The controller 16 may use data from the engine load control module 50 and/or the DPF evaluation module 52 as inputs into a particulate matter evaluation model that may estimate the status/capacity of the DPF 38.

When the DPF evaluation module 52 determines that the DPF 38 requires regeneration, the controller 16 may provide a control signal to the engine 18 or to an associated engine control module to adjust the operation of the engine 18 and initiate the regeneration to increase the exhaust temperature. In one embodiment of the disclosure, the controller 16 may increase the exhaust temperature by injecting fuel from the fuel system 24 into the exhaust gas flow. Alternatively, the controller may increase the exhaust temperature by instructing the TCM to downshift the transmission 40, thereby increasing the engine speed and thus the engine out exhaust gas temperature without the injection of fuel from the fuel system into the exhaust gas flow.

The controller 16 may include a computer and/or processor, and include all software, hardware, memory, algorithms, connections, sensors, etc., necessary to monitor and control the various components of the engine assembly 12. As such, a control method operative to initiate a regeneration process may be embodied as software or firmware associated with the controller 16. It should be appreciated that the controller 16 may also include any device capable of analyzing data from various sensors, comparing data, making the necessary decisions required to control and monitor the engine assembly 12.

Figure 2:
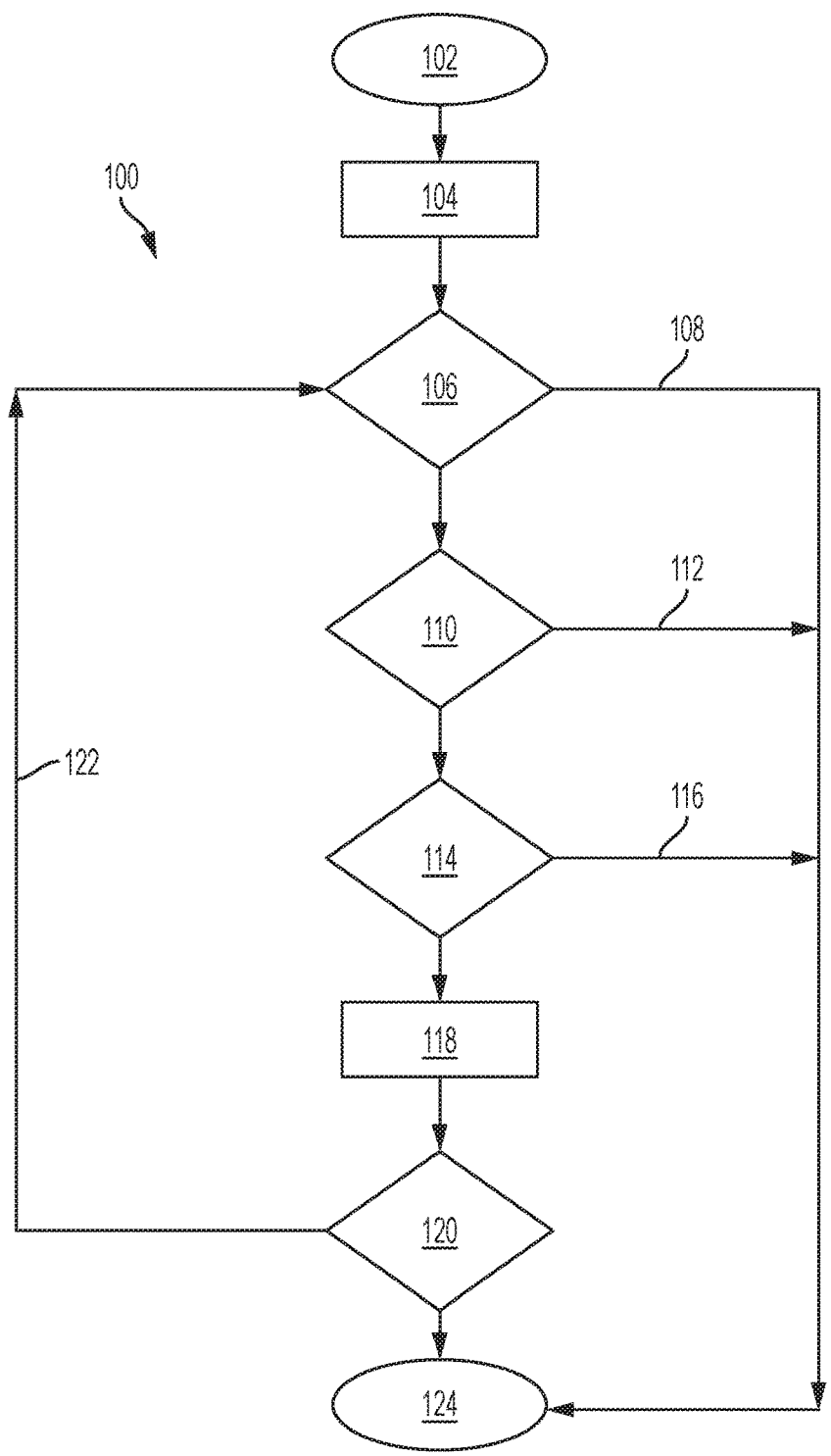
FIG. 2 is a control block diagram of control logic for the system and method according to the present disclosure.

With reference to FIG. 2, control logic 100 for regeneration of the DPF 38 is illustrated. During operation of engine assembly 12, DPF 38 may accumulate particulate matter that is present in the exhaust gas from diesel engine 18. The DPF 38 may be regenerated or cleaned when a predetermined particulate matter accumulation limit is exceeded in the DPF 38. The DPF 38 may be cleaned or regenerated by the oxidation or burning of the accumulated carbon and other particulates above a predetermined temperature limit, such as a temperature greater than at least 550 degrees Celsius and in an excess oxygen environment.

Accordingly, control logic 100 may begin at entry block 102, wherein the controller executes the control logic 100 to initiate the DPF evaluation process. The controller instructs the DPF evaluation module to monitor at least one parameter indicative of the soot or particulate matter accumulation in the DPF at step or block 104. In one embodiment of the disclosure, the DPF evaluation module 52 may calculate an accumulation of particulate matter within the DPF 38 in a variety of ways including a particulate matter loading calculation and/or an algorithm based on operating time of the diesel engine 18, distance traveled by the vehicle 10, and fuel consumption of diesel engine 18.

At step or block 106, the DPF evaluation module 52 may make a comparison between the particulate matter accumulation parameter and a predetermined threshold or limit to determine if DPF regeneration may be required. The determination of when the regeneration mode will be initiated can be based on one or more of several factors or parameters. For example, the controller 16 may keep track of engine run time, vehicle mileage or fuel consumption since the last regeneration process occurred, and initiate the regeneration process after a predetermined amount of engine run time, vehicle mileage or fuel consumption, as the case may be.

For another example, the controller 16 may determine the pressure drop across the DPF 38 by calculating the difference in measured pressure between an upstream pressure sensor and a downstream pressure sensor, with the regeneration process initiated when a predetermined pressure difference across the DPF 38 is reached. In one embodiment of the disclosure, the estimation methodology may be most reliable during steady-state or non-transient operation, at a steady-state operational temperature, as opposed to a cold start, and at a high exhaust mass-flow rate. These ideal conditions may occur, for example, during steady-state expressway driving.

If the determined particulate matter accumulation is less than the predetermined limit, controller 16 may terminate the control logic regeneration process as represented by line 108. If the determined particulate matter accumulation is greater than or equal to the predetermined limit, control logic 100 may proceed to step or block 110 where the control logic evaluates and determines an operating mode or condition of the transmission assembly 14 of the vehicle 10. Determination of the operating mode of the transmission assembly 14 of vehicle 10 may include, but not be limited to, an evaluation of the transmission mode of the vehicle and/or an operating gear position of the transmission assembly 14, either individually or in any combination.

In one embodiment of the disclosure, controller 16 is in communication with a transmission control module (TCM). The TCM may be in electrical communication with the engine load control module 50 and may be configured to monitor TCM-initiated transmission to engine requests for changes in engine speed. TCM monitors and controls the transmission 40 to place the vehicle in one of a variety of available transmission modes, including, but not limited to, a forward or drive mode, reverse mode, neutral mode or parked mode.

If the TCM detects that the transmission 40 is placed in a reverse mode, neutral mode or parked mode, controller 16 may terminate the control logic regeneration process as shown by line 112. If the TCM detects that the transmission is in a drive operation mode, control logic 100 may then proceed to step or block 114 to evaluate and determine the operating state of the vehicle 10. The determination of the operating state of vehicle 10 may result from evaluation of at least one parameter of the vehicle or a number of factors, including, but not limited to, an engine speed parameter 18, an engine load parameter and/or the operating speed of the vehicle 10, either individually or in any combination.

In one embodiment of the disclosure, the speed of vehicle 10 of at least about 25 miles per hour may generally indicate to the control logic 100 that the vehicle 10 is in condition for regeneration. Alternatively or additionally, an engine speed parameter of at least about 1000 revolutions per minute (rpm) of the engine crankshaft 26 with the vehicle in a drive mode may generally indicate that vehicle 10 is in condition for regeneration. Alternatively, or additionally, an operating gear of transmission 40 in at least one drive mode position may generally indicate that the vehicle 10 is in condition for regeneration. It may be understood that, if diesel engine 18 is in a drive mode, vehicle 10 may be in condition for execution of the regeneration process.

If vehicle 10 is not in condition for regeneration of the DPF 38, control logic 100 may terminate the regeneration process as represented by line 116. If the operating state of vehicle 10 is in condition for regeneration of DPF 38, control logic 100 may proceed to step or block 118 wherein the control logic may instruct the TCM to execute a custom transmission shift strategy to adjust the transmission 40 from a first transmission to a second lower transmission position to increase engine speed while maintaining vehicle speed to increase exhaust flow to the DPF 38 when the determined particulate matter accumulation level is greater than the predetermined particulate matter accumulation.

In one embodiment of the disclosure, regeneration of the DPF 38 may include increasing the engine speed of diesel engine 18 resulting from adjustment of the transmission 40 from the first transmission position to at least one lower second transmission position. The increased engine speed may generate a higher exhaust gas flow relative to a normal vehicle drive mode, resulting in higher oxygen mass flow through the DPF 38.

It is appreciated that the control logic 100 implemented by controller 16 will cause the regeneration process to occur in the DPF 38 by various known means. The particular actions taken by the controller 16 may depend upon the engine and vehicle operating conditions as well as the ambient conditions. In essence, the oxygen mass flow is raised sufficiently resulting from increased exhaust flow generated by higher engine speeds from the adjustment of the transmission to a lower gear during normal operation mode to cause the particulate matter or soot built up in the DPF 38 to burn off to improve the function of the DPF 38 and return the DPF 38 to a normal operating state.

In addition to the increased engine load applied by transmission assembly 14, regeneration of DPF 38 may include control of various operating parameters of engine assembly 12. Control of operating parameters of engine assembly 12 may include increasing the number fuel injection events per cylinder firing event, retarding injection timing, injecting fuel into the exhaust stream, and actuation of throttle 30.

Figure 3:
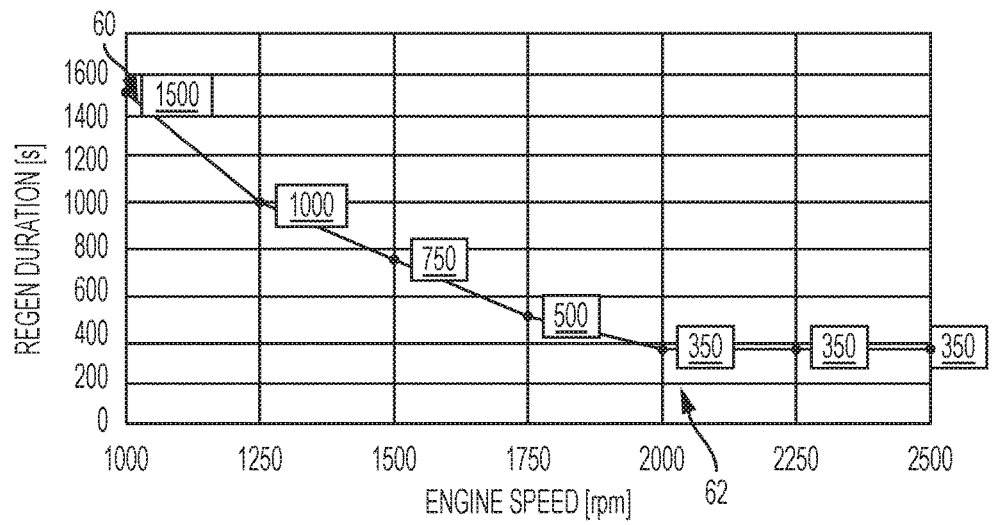
FIG. 3 is an illustration of the regeneration process based upon engine speed and time of the system and method in accordance with the disclosure.
Figure 4:
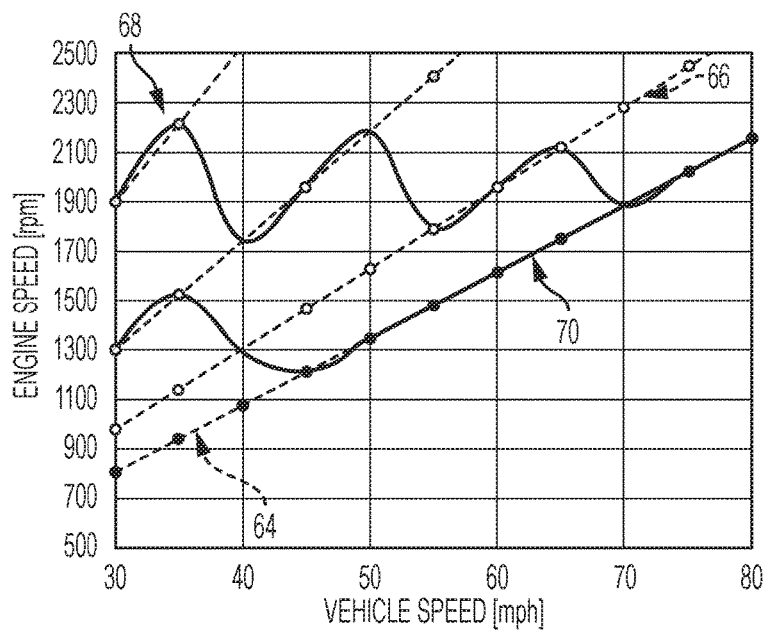
FIG. 4 is an illustration of the regeneration process based upon engine speed and vehicle speed of the system and method in accordance with the disclosure.

Referring additionally now to FIGS. 3 and 4, a further description of the use of the control logic of the controller of the present disclosure to reduce or eliminate particulate matter accumulation in the DPF during a normal exhaust combustion mode operation of the vehicle in a drive mode is provided. FIG. 3 illustrates the effect of engine speed on the regeneration process with an x-axis of the graph defining engine speed in revolutions per minute (rpm) and the y-axis of the graph defining the time or duration required to complete a regeneration process shown in seconds (s). In some vehicle operation conditions, a low engine speed of around 1000 rpm as represented by line 60, produces minimal oxygen content in the exhaust, as the low engine speed fails to provide sufficient airflow. The resultant oxygen levels resulting from the low engine speed limit the effectiveness of the DPF regeneration process and significantly increase the amount of time required to complete regeneration.

Conversely, as represented by line 62, use of higher engine speeds of at least about 2000 rpm, sufficient oxygen conditions exist to ensure a more efficient regeneration process and limit potential hydrocarbon slip or leakage during the process. FIG. 4 illustrates a graph of vehicle speed in miles per hour (mph) along the x-axis and a y-axis illustrating engine speed in revolutions per minute (rpm). As is shown in FIG. 4, by utilizing the transmission calibration strategy of the present disclosure to adjust the transmission assembly from a first transmission position, such as $9^{th}$ gear with a variety of engine speed and vehicle speed data points connected by line referenced as number 64, to at least one second or lower transmission position, such as $8^{th}$ gear as shown and referenced by number 66.

The regeneration process, represented by line and number 68, can be accomplished utilizing lower gears to create higher engine speed rpms at lower vehicle speeds, then can be generated under the normal transmission operating mode, as referenced by line and number 70. In one embodiment of the disclosure, engine speeds between about 1700 rpms to about 2300 rpms may be used to achieve the desired result. Use of a numerically lower gear at normal highway speeds, for example 8th gear as opposed to 9th gear, may produce engine speeds that are better aligned with the requirements of the DPF regeneration process, which may also be beneficial for regeneration duration, regeneration fuel consumption, emissions upward adjustment factor (UAF), and diagnostic infrequent regeneration adjustment factor (IRAF).

At step or block 120, the control logic 100 evaluates the DPF 38 to determine if the regeneration is complete. If the regeneration process is not complete, the control logic 100 allows the regeneration process to continue as represented by line 122. The controller 16 may continue with the process until the desired amount of regeneration is achieved. This may be based, for example, on a predetermined pressure drop across the DPF 38 being achieved, a predetermined length of regeneration time, or a particulate matter regeneration algorithm that estimates the amount of particulate matter burn-off achieved. When regeneration is complete, the regeneration operation is stopped at step or block 124 and normal operation is resumed.

The controller 16 may include a computer-readable medium (also referred to as a processor-readable medium), including any non-transitory (e.g., tangible) medium that participates in providing data (e.g., instructions) that may be read by a computer (e.g., by a processor of a computer).

Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of reducing particulate matter accumulation in a diesel particulate filter of an exhaust system of a vehicle comprising the steps of:
    operating the vehicle including an engine connected to the exhaust system in a drive mode;
    monitoring at least one parameter indicative of particulate matter accumulation in the diesel particulate filter;
    evaluating the at least one parameter indicative of particulate matter accumulation against a predetermined particulate matter accumulation limit;
    determining a condition of a transmission assembly operatively connected to the engine;
    initiating a regeneration mode in the diesel particulate filter of the exhaust system in response to determining that the at least one parameter indicative of particulate matter accumulation exceeds the predetermined particulate matter accumulation limit and determining the condition of the transmission assembly is in a drive operation mode;
    determining at least one operating state of the vehicle, wherein the operating state of the vehicle is determined by evaluating at least one operating parameter of the vehicle selected from the group consisting of an engine speed parameter of at least 1000 revolutions per minute or an operating speed of the vehicle of at least 25 miles per hour;
    adjusting the transmission assembly in the drive operation mode from a first transmission position to at least one second lower transmission position in response to the detection of the at least one operating parameter of the vehicle to increase the engine speed of the engine while maintaining the operating speed of the vehicle to increase exhaust flow from the engine through the diesel particulate filter of the exhaust system; and
    regenerating the diesel particulate filter by burning off the particulate matter accumulation using the increased exhaust gas flow from the increased engine speed during the drive mode.

2. The method of claim 1 further comprising the step of providing a diesel particulate filter evaluation module to monitor the diesel particulate filter and evaluate the at least one parameter indicative of particulate matter accumulation in the diesel particulate filter against a predetermined particulate matter accumulation.

3. The method of claim 2 further comprising the step of monitoring a pressure differential across the diesel particulate filter with the diesel particulate filter evaluation module.

4. The method of claim 1 further comprising the step of providing a transmission control module in communication with the transmission assembly and configured to adjust the transmission assembly between the first transmission position and at least one second transmission position.

5. The method of claim 4 wherein the transmission control module adjusts the transmission assembly in the drive operation mode from the first transmission position to at least one second transmission position lower than the first transmission position in response to the detection of the at least one operating parameter of the vehicle to increase the engine speed of the engine while maintaining the operating speed of the vehicle to increase exhaust flow through the diesel particulate filter.

6. The method of claim 1 wherein the step of determining the condition of a transmission assembly operatively connected to the engine further comprises determining the operation mode of the transmission assembly by detecting an operating gear position of the transmission assembly.

7. The method of claim 1 wherein the step of initiating a regeneration mode in the diesel particulate filter of the exhaust system is determined by evaluating at least one parameter of the vehicle selected from the group consisting of engine run time, vehicle operation mileage and vehicle fuel consumption since the occurrence of a prior regeneration mode of the diesel particulate filter.

8. The method of claim 1 wherein the step of regenerating the diesel particulate filter by burning off the particulate matter accumulation comprises oxidation or burning of carbon and particulates accumulated in the diesel particulate filter above a predetermined temperature limit greater than at least 550 degrees Celsius, and in an excess oxygen environment in the diesel particulate filter.

9. The method of claim 1 wherein the step of regenerating the diesel particulate filter by burning off the particulate matter accumulation is accomplished by generating engine speeds between 1700 revolutions per minute and 2300 revolutions per minute while maintaining the operating speed of the vehicle to increase exhaust flow from the engine through the diesel particulate filter of the exhaust system.

10. The method of claim 1 further comprising the step of determining if the regeneration mode in the diesel particulate filter of the exhaust system is complete by evaluating an amount of regeneration of the diesel particulate filter utilizing one or more parameters selected from the group consisting of a predetermined pressure drop across the diesel particulate filter, a predetermined length of regeneration time, and a particulate matter regeneration algorithm estimating an amount of particulate matter burn-off achieved in the diesel particulate filter.

11. The method of claim 2 wherein the step of monitoring the diesel particulate filter with the diesel particulate filter evaluation module further comprises calculating an accumulation of particulate matter within the diesel particulate filter using an algorithm utilizing one or more parameters selected from the group consisting of operating time of the engine, distance traveled by the vehicle, and fuel consumption of the engine.

12. The method of claim 4 wherein the transmission control module is configured to monitor and control the transmission assembly to place the vehicle in at least one transmission mode selected from the group consisting of the drive operation mode, a reverse mode, a neutral mode and a parked mode.

13. A method of reducing particulate matter in a diesel particulate filter of an exhaust system of a vehicle comprising the steps of:
   operating the vehicle including an engine connected to the exhaust system in a drive mode;
   monitoring at least one parameter indicative of particulate matter accumulation in the diesel particulate filter;
   evaluating the at least one parameter indicative of particulate matter accumulation against a predetermined particulate matter accumulation with a diesel particulate filter evaluation module;
   determining an operating gear position of a transmission assembly operatively connected to the engine with a transmission control module in communication with the transmission assembly;
   initiating a regeneration mode in the diesel particulate filter of the exhaust system in response to determining that the at least one parameter indicative of particulate matter accumulation exceeds the predetermined particulate matter accumulation limit and determining the operating gear position of the transmission assembly;
   determining at least one operating state of the vehicle, wherein the operating state of the vehicle is determined by evaluating at least one operating parameter of the vehicle selected from the group consisting of an engine speed parameter of at least 1000 revolutions per minute or an operating speed of the vehicle of at least 25 miles per hour;
   adjusting the operating gear position of the transmission assembly from a first transmission position to at least one second lower transmission position in response to detection of the at least one operating parameter of the vehicle;
   increasing the engine speed while maintaining the operating speed of the vehicle to increase the exhaust gas flow from the engine through the diesel particulate filter of the exhaust system; and
   regenerating the diesel particulate filter by burning off the particulate matter accumulation using increased oxygen gas flow generated in the exhaust gas flow generated by the increased engine speed from the engine when the transmission assembly is positioned in the at least one second lower transmission position while maintaining the operating speed of the vehicle.

14. The method of claim 13 further comprising the step of monitoring a pressure differential across the diesel particulate filter with the diesel particulate filter evaluation module.

15. The method of claim 13 wherein the step of initiating a regeneration mode in the diesel particulate filter of the exhaust system is determined by evaluating at least one parameter of the vehicle selected from the group consisting of engine run time, vehicle operation mileage and vehicle fuel consumption since the occurrence of a prior regeneration mode of the diesel particulate filter.

16. The method of claim 13 wherein the step of regenerating the diesel particulate filter by burning off the particulate matter accumulation comprises oxidation or burning of carbon and particulates accumulated in the diesel particulate filter above a predetermined temperature limit greater than at least 550 degrees Celsius, and in an excess oxygen environment in the diesel particulate filter.

17. The method of claim 13 wherein the step of regenerating the diesel particulate filter by burning off the particulate matter accumulation is accomplished by generating engine speeds between 1700 revolutions per minute and 2300 revolutions per minute while maintaining the operating speed of the vehicle to increase exhaust flow from the engine through the diesel particulate filter of the exhaust system.

18. The method of claim 13 further comprising the step of determining if the regeneration mode in the diesel particulate filter of the exhaust system is complete by evaluating an amount of regeneration of the diesel particulate filter utilizing one or more parameters selected from the group consisting of a predetermined pressure drop across the diesel particulate filter, a predetermined length of regeneration time, and a particulate matter regeneration algorithm estimating an amount of particulate matter burn-off achieved in the diesel particulate filter.

19. The method of claim 13 wherein the transmission control module is configured to monitor and control the transmission assembly to place the vehicle in at least one transmission mode selected from the group consisting of the drive operation mode, a reverse mode, a neutral mode and a parked mode.

20. The method of claim 14 wherein the step of monitoring the diesel particulate filter with the diesel particulate filter evaluation module further comprises calculating an accumulation of particulate matter within the diesel particulate filter using an algorithm utilizing one or more parameters selected from the group consisting of operating time of the engine, distance traveled by the vehicle, and fuel consumption of the engine.

21. A method of reducing particulate matter in a diesel particulate filter of an exhaust system of a vehicle comprising the steps of:
   operating the vehicle including an engine connected to the exhaust system in a drive mode;
   monitoring a pressure differential indicative of particulate matter accumulation in the diesel particulate filter;

evaluating the pressure differential indicative of particulate matter accumulation against a predetermined particulate matter accumulation with a diesel particulate filter evaluation module;

determining an operating gear position of a transmission assembly operatively connected to the engine with a transmission control module in communication with the transmission assembly;

initiating a regeneration mode in the diesel particulate filter of the exhaust system in response to determining that the at least one parameter indicative of particulate matter accumulation exceeds the predetermined particulate matter accumulation limit and the determining the operating gear position of the transmission assembly;

determining at least one operating state of the vehicle, wherein the operating state of the vehicle is determined by evaluating at least one operating parameter of the vehicle selected from the group consisting of an engine speed parameter of at least 1000 revolutions per minute or an operating speed of the vehicle of at least 25 miles per hour;

adjusting the operating gear position of the transmission assembly from a first transmission position to at least one second lower transmission position in response to detection of the at least one operating parameter of the vehicle;

increasing the engine speed while maintaining the operating speed of the vehicle to increase the exhaust gas flow from the engine through the diesel particulate filter of the exhaust system;

regenerating the diesel particulate filter by burning off the particulate matter accumulation using increased oxygen gas flow generated in the exhaust gas flow generated by the increased engine speed from the engine when the transmission assembly is positioned in the at least one second lower transmission position while maintaining the operating speed of the vehicle; and determining if the regeneration mode in the diesel particulate filter of the exhaust system is complete by evaluating an amount of regeneration of the diesel particulate filter utilizing one or more parameters selected from the group consisting of a predetermined pressure drop across the diesel particulate filter, a predetermined length of regeneration time, and a particulate matter regeneration algorithm estimating an amount of particulate matter burn-off achieved in the diesel particulate filter.

22. The method of claim 21 wherein the step of regenerating the diesel particulate filter by burning off the particulate matter accumulation is accomplished by generating engine speeds between 1700 revolutions per minute and 2300 revolutions per minute while maintaining the operating speed of the vehicle to increase exhaust flow from the engine through the diesel particulate filter of the exhaust system.

* * * * *